J. PATRONAGGIO.
SHAVING CUP.
APPLICATION FILED MAY 14, 1909.

955,679.

MODEL.

Patented Apr. 19, 1910.

Witnesses:

Inventor:
Joseph Patronaggio

UNITED STATES PATENT OFFICE.

JOSEPH PATRONAGGIO, OF NEW YORK, N. Y.

SHAVING-CUP.

955,679.   Specification of Letters Patent.   Patented Apr. 19, 1910.

Application filed May 14, 1909. Serial No. 496,070. (Model.)

*To all whom it may concern:*

Be it known that I, JOSEPH PATRONAGGIO, a citizen of the United States, and a resident of the city of New York, borough of Manhattan, in the county and State of New York, have invented a new and Improved Shaving-Cup, of which the following is a full, clear, and exact description.

My invention relates to shaving cups, and it has for its object to provide one with a receptacle at one side and a soap holder at the other side disposed above the plane of the bottom of the receptacle, there being indentures in the bottom of the soap holder with which the soap is adapted to engage to hold the soap in place when the barber is making a lather by moving a shaving brush across or around the soap.

Another object of the invention is to provide a shaving brush, the body and handle of which are telescopic and are connected by a bayonet joint so that the brush may be disposed wholly within the receptacle and the cup may be covered by a lid which is provided for this purpose.

Still other objects of the invention will appear in the following complete description.

In this specification I will describe the preferred form of my invention, it being understood that the scope of the invention is defined in the appended claim.

Reference is to be had to the accompanying drawings forming a part of this specification in which similar characters of reference indicate corresponding parts in all the views.

Figure 1:
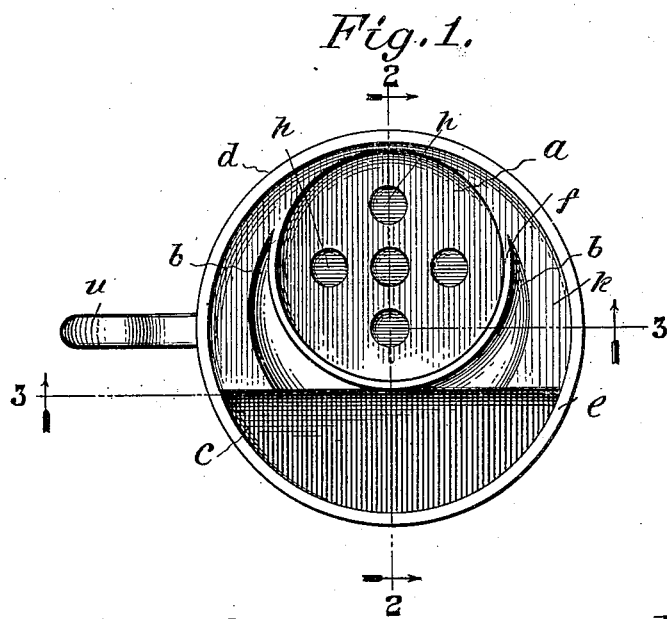
Figure 2:
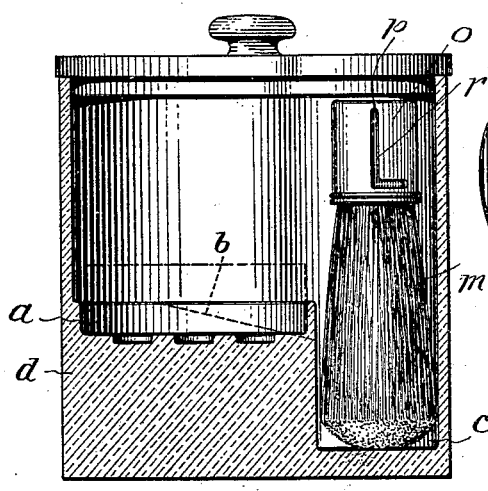
Figure 3:
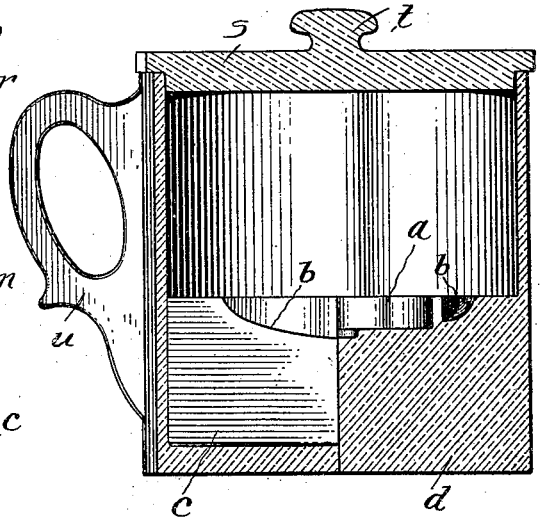

Figure 1 is a plan view of my invention; Fig. 2 is a sectional view on the line 2—2 of Fig. 1; and Fig. 3 is a sectional view on the line 3—3 of Fig. 1.

By referring to the drawings it will be seen that the cup $e$ has a bottom, the principal portion $d$ of which is of considerable thickness, the remainder being cut away to form the receptacle $c$. On the principal portion $d$ of the bottom there is cut a rim $f$ inclosing a soap holder $a$, there being annular indentures $h$ in the soap holder with which the soap is adapted to engage to hold it stationary when the barber is making a lather by rubbing the brush over the soap. The rim $f$ unites with top portions $k$ of the principal portion $d$ of the bottom near the periphery of the cup $e$, there being drains $b$ disposed between the rim $f$ and the top portions $k$, the inner sides of which are in close proximity to the rim $f$, the drains $b$ increasing in width toward the inner rim of the receptacle $c$.

Disposed in the receptacle $c$ there is a brush $m$ with a stock $o$, the stock $o$ being hollow to permit the handle to be disposed within it, the handle having a pin $p$ which is disposed in an L-shaped slot $r$ forming a bayonet joint. The cup $e$ is covered by a lid $s$ having a handle $t$, the cup having a handle $u$.

In using my invention, the barber removes the lid $s$ and pours a little water into the receptacle $c$ when the handle of the brush is drawn outwardly permitting the pin $p$ to slide laterally in the L-shaped slot $r$, thereby locking the handle in an extended position to the brush. This having been done the barber proceeds to make the necessary lather by moving the brush across the soap disposed in the soap holder $a$, the soap being prevented from turning in the soap holder $a$ by means of the roughened surface produced by the indentures $h$. These indentures $h$ also serve to hold the remainder of the soap after the bulk of the cake has been used. When the lather has been made, should the barber desire to lay the brush down, he may do so by disposing it on the soap holder, or across the top of the portion $d$ of the bottom of the cup, the drains $b$ serving to carry off any liquid in the receptacle $c$.

Having thus described my invention, I claim as new and desire to secure by Letters Patent:

In a shaving cup, a body in which there is a receptacle, a soap holder in the body at one side and above the plane of the bottom of the receptacle, there being indentures in the bottom of the soap holder to retain small particles of soap, and drains disposed one at each side of the soap holder, the drains leading to the receptacle.

JOSEPH PATRONAGGIO.

Witnesses:
VINCENZO DI GREGORIO,
FRANCESCO BONOMOLO.